United States Patent
Chen et al.

(10) Patent No.: US 12,487,580 B2
(45) Date of Patent: Dec. 2, 2025

(54) THERMAL IMAGE DETERMINATION

(71) Applicant: Peridot Print LLC, Palo Alto, CA (US)

(72) Inventors: Lei Chen, Palo Alto, CA (US); Maria Fabiola Leyva Mendivil, Guadalajara (MX); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 419 days.

(21) Appl. No.: 18/017,288

(22) PCT Filed: Jul. 29, 2020

(86) PCT No.: PCT/US2020/044113
§ 371 (c)(1),
(2) Date: Jan. 20, 2023

(87) PCT Pub. No.: WO2022/025886
PCT Pub. Date: Feb. 3, 2022

(65) Prior Publication Data
US 2023/0288910 A1 Sep. 14, 2023

(51) Int. Cl.
*G05B 19/4099* (2006.01)
*B22F 10/85* (2021.01)
*B33Y 50/00* (2015.01)

(52) U.S. Cl.
CPC .......... *G05B 19/4099* (2013.01); *B22F 10/85* (2021.01); *B33Y 50/00* (2014.12); *G05B 2219/49023* (2013.01)

(58) Field of Classification Search
CPC ...... G05B 19/4099; G05B 2219/49023; B22F 10/85; B33Y 50/00; Y02P 10/25; G06T 3/4046; G06T 3/4053
See application file for complete search history.

(56) References Cited

U.S. PATENT DOCUMENTS

| | | |
|---|---|---|
| 2016/0224017 A1* | 8/2016 | Huang .................... B22F 12/90 |
| 2017/0341183 A1 | 11/2017 | Buller et al. |
| 2018/0169948 A1* | 6/2018 | Coeck .................... G01N 25/72 |
| 2019/0001573 A1 | 1/2019 | Gulbrandsen et al. |
| 2019/0070787 A1 | 3/2019 | Higgs, III et al. |
| 2019/0329499 A1 | 10/2019 | Parangi |
| 2019/0337232 A1 | 11/2019 | Prabha Narra et al. |
| 2020/0122403 A1 | 4/2020 | Dhokia et al. |
| 2020/0130282 A1 | 4/2020 | Fan et al. |

FOREIGN PATENT DOCUMENTS

| | | | | |
|---|---|---|---|---|
| WO | WO-2020091724 A1 * | 5/2020 | ........... | B29C 64/386 |
| WO | WO-2020122897 A1 * | 6/2020 | ........... | B29C 64/209 |

* cited by examiner

*Primary Examiner* — Chad G Erdman
(74) *Attorney, Agent, or Firm* — Shook, Hardy & Bacon

(57) ABSTRACT

Examples of methods for thermal image determination are described. In some examples, a method may include determining, using a first machine learning model, a first thermal image of a first layer of additive manufacturing. In some examples, the method may include determining, using a second machine learning model, a second thermal image of a second layer based on a simulated thermal image. The second thermal image may have a second resolution that is greater than a first resolution of the simulated thermal image in some examples. In some examples, the method may include determining, using a third machine learning model, a third thermal image based on the first thermal image and the second thermal image.

14 Claims, 7 Drawing Sheets

THERMAL IMAGE DETERMINATION

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. In some additive manufacturing techniques, the build material may be cured or fused.

DETAILED DESCRIPTION

Figure 1:
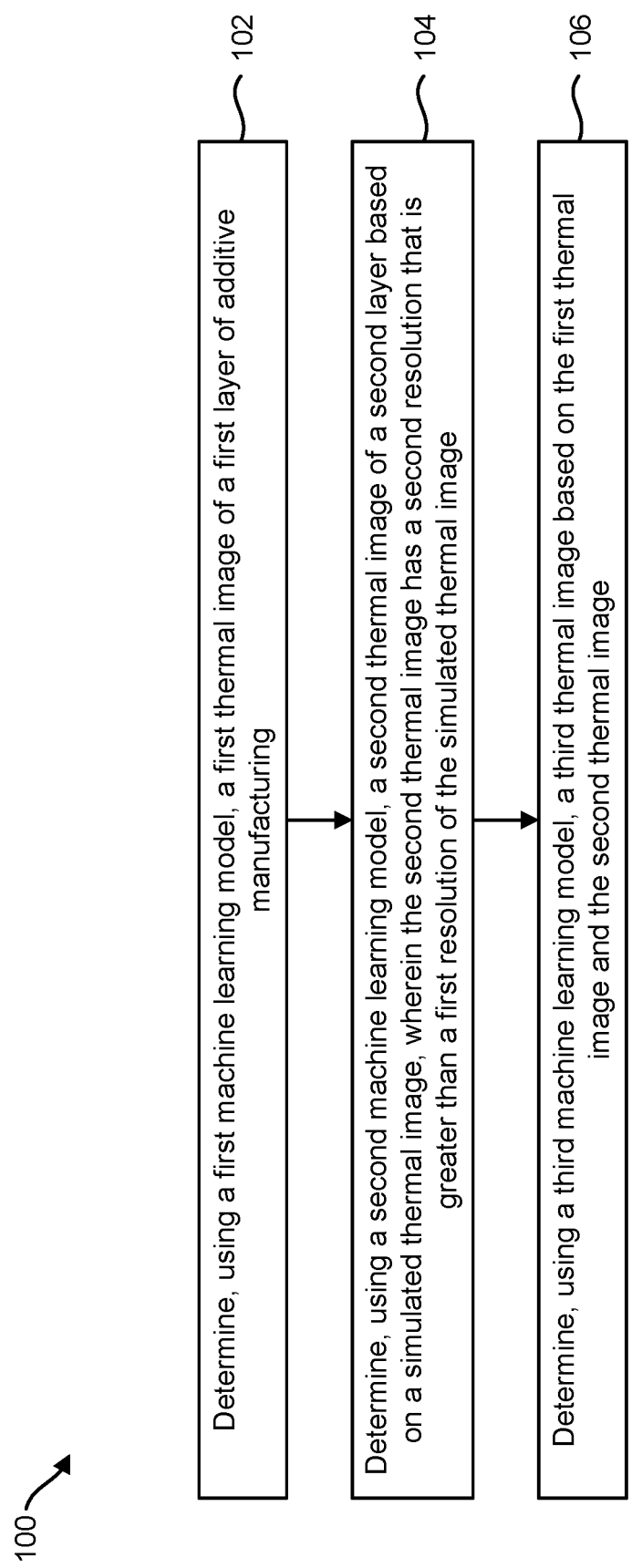
FIG. 1 is a flow diagram illustrating an example of a method for thermal image determination.

Additive manufacturing may be used to manufacture three-dimensional (3D) objects. 3D printing is an example of additive manufacturing. Some examples of 3D printing may selectively deposit agents (e.g., droplets) at a pixel level to enable control over voxel-level energy deposition. For instance, thermal energy may be projected over material in a build area, where a phase change (for example, melting and solidification) in the material may occur depending on the voxels where the agents are deposited.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. Examples of a voxel size dimension may include 25.4 millimeters (mm)/150≈170 microns for 150 dots per inch (dpi), 490 microns for 50 dpi, 2 mm, etc. The term "voxel level" and variations thereof may refer to a resolution, scale, or density corresponding to voxel size. In some examples, the term "voxel" and variations thereof may refer to a "thermal voxel." In some examples, the size of a thermal voxel may be defined as a minimum that is thermally meaningful (e.g., greater than or at least 42 microns or 600 dots per inch (dpi)). A set of voxels may be utilized to represent a build volume.

A build volume is a volume in which an object or objects may be manufactured. A "build" may refer to an instance of 3D manufacturing. A layer is a portion of a build volume. For example, a layer may be a cross section (e.g., two-dimensional (2D) cross section) of a build volume. In some examples, a layer may refer to a horizontal portion (e.g., plane) of a build volume. In some examples, an "object" may refer to an area and/or volume in a layer and/or build volume indicated for forming an object.

In some examples of 3D manufacturing (e.g., Multi Jet Fusion (MJF)), each voxel in the build volume may undergo a thermal procedure (approximately 15 hours of build time (e.g., time for layer-by-layer printing) and approximately 35 hours of additional cooling). The thermal procedure of voxels that include an object may affect the manufacturing quality (e.g., functional quality) of the object.

Some theory-based simulation approaches (e.g., simulations based on thermodynamics laws) may provide additional spatial and temporal information for the thermal procedure (e.g., manufacturing). However, some types of simulations may be computationally expensive, where it may be difficult to achieve a discrete resolution near a print resolution. An example of print resolution is 42 microns in x-y dimensions and 80 microns in a z dimension. It may be useful to provide thermal information at or near print resolution (e.g., 75 dpi) for guiding the placement of an agent or agents (e.g., fusing agent, detailing agent, and/or other thermally relevant fluids). In some examples, there is a sizable gap between the resolutions that process simulation can afford (e.g., approximately 6 dpi) and a print resolution (e.g., approximately 100 dpi in x-y dimensions and 100 dpi in the z dimension).

In some examples, thermal information or thermal behavior may be mapped as a thermal image. A thermal image is a set of data indicating temperature(s) (or thermal energy) in an area. A thermal image may be sensed, captured, simulated, and/or enhanced.

The terms "low resolution" and "high resolution" are utilized herein, where "high resolution" denotes a resolution that is greater than "low resolution." In some examples, low resolution may refer to a resolution that is less than or not more than 50 dpi (e.g., 25 dpi, 12 dpi, 6 dpi, 1 mm voxel dimension, 2 mm voxel dimension, 4 mm voxel dimension, etc.). In some examples, high resolution may refer to a resolution that is greater than or at least 50 dpi (e.g., 100 dpi, 150 dpi, 0.17 mm voxel dimension, 0.08 mm voxel dimension, etc.).

A "simulation voxel" is a discrete volume used for simulation. Simulation voxel size may be set in accordance with a target resolution. For example, simulation voxel size may be set to a print resolution (e.g., approximately the same size as a voxel size for printing), or may be set to be larger for a lower resolution in simulation. In some examples, voxels or simulation voxels may be cubic or rectangular prismatic. An example of three-dimensional (3D) axes includes an x dimension, a y dimension, and a z dimension. In some examples, a quantity in the x dimension may be referred to as a width, a quantity in the y dimension may be referred to as a length, and/or a quantity in the z dimension may be referred to as a height. The x and/or y axes may be referred to as horizontal axes, and the z axis may be referred to as a vertical axis. Other orientations of the 3D axes may be utilized in some examples, and/or other definitions of 3D axes may be utilized in some examples.

While plastics (e.g., polymers) may be utilized as a way to illustrate some of the approaches described herein, some the techniques described herein may be utilized in various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as Stereolithography (SLA), Multi Jet Fusion (MJF), Metal Jet Fusion, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation.

In some examples, "powder" may indicate or correspond to particles. In some examples, an object may indicate or correspond to a location (e.g., area, space, etc.) where particles are to be sintered, melted, or solidified. For example, an object may be formed from sintered or melted powder.

Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), convolutional LSTM (Conv-LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized in accordance with some examples of the techniques described herein.

Some examples of the techniques described herein may utilize a machine learning model or models (e.g., deep learning) to provide data at or near print resolution (e.g., overcome the resolution gap). In some examples, this may enable process simulation results to be utilized for printer operational management. For instance, some of the techniques described herein provide approaches to enhance the resolution of thermal information provided by a simulation. Some examples of the techniques described herein may utilize simulation results and geometrical data to enhance the simulation results in a dimension or dimensions (e.g., x, y, z, and/or time dimensions). For example, machine learning (e.g., deep learning, neural network(s), etc.) may be applied to enhance resolution of the thermal information. Some examples of machine learning models, once trained, may operate relatively quickly (e.g., on the order of 100 milliseconds per print layer). Accordingly, resolution enhancement may be performed without adding a significant or large amount of computational cost. Examples of the machine learning models described herein may include neural networks, deep neural networks, spatio-temporal neural networks, etc.

Some examples of the techniques described herein may utilize machine learning (e.g., deep learning) to accelerate data production from simulated thermal images and/or to enhance the resolution of simulated thermal images in spatial and/or time dimensions. Some examples of the techniques may include approaches to create simulation results to train the machine learning model(s). Some examples of the techniques may include machine learning computational flow architectures that utilize simulation results and geometrical data (e.g., 3D model data, 2D slices, contone maps, etc.) to increase resolution in spatial (e.g., x, y, and/or z) and/or time dimensions. In some examples, the machine learning computational flow may utilize data with increased resolution x-y dimensions to increase resolution in z and/or time dimensions. In some examples, the machine learning computational flow may include three different deep learning approaches to compose high-resolution results from simulation data. In some examples, the high-resolution results may be utilized to perform print operations by a printer controller. In some examples, high-resolution results may be compared with in-line printer thermal sensing to improve and/or correct the simulation. The comparison (e.g., difference) may be applied to inform simulation tuning. In some examples, the comparison may be utilized to adjust print fluid (e.g., agent, ink, etc.) distribution.

Some examples of the techniques described herein may allow process simulation beyond offline prediction, which may predict a batch's yield before printing. For instance, some examples of the techniques described may allow simulation to be utilized in operational applications due to quantitative results with increased resolution (e.g., at or near print resolution). Some examples of the techniques described herein may be implemented in a printer operating system to provide thermal behavior prediction and/or guide thermal management at a voxel level (e.g., agent distribution). In some examples, the machine learning computational flow may be utilized in post processing to generate high-resolution results that are at or near print resolution. In some examples, the enhanced resolution results may be produced at a selected height range, selected time range, and/or selected resolution enhancement scale. The enhanced resolution results may enable closer thermal inspection. For instance, some of the techniques described herein may provide online and/or near-real time enhanced resolution results (e.g., results at or near print resolution). In some examples, enhanced results may be produced for a selected height range (e.g., 0 millimeters (mm)-16 mm), for a selected time range (e.g., 13-16 seconds), and/or selected resolution enhancement scale (e.g., 4× enhancement, 16× enhancement, etc.).

Throughout the drawings, identical or similar reference numbers may designate similar, but not necessarily identical, elements. When an element is referred to without a reference number, this may refer to the element generally, without necessary limitation to any particular Figure. The figures are not necessarily to scale, and the size of some parts may be exaggerated to more clearly illustrate the example shown. Moreover, the drawings provide examples in accordance with the description; however, the description is not limited to the examples provided in the drawings.

FIG. 1 is a flow diagram illustrating an example of a method 100 for thermal image determination. For example, the method 100 may be performed to produce a thermal image or thermal images. The method 100 and/or an element or elements of the method 100 may be performed by an electronic device. For example, the method 100 may be performed by the apparatus 324 described in relation to FIG. 3.

The apparatus may determine 102, using a first machine learning model, a first thermal image of a first layer of additive manufacturing. For example, the first machine learning model may be trained to determine (e.g., predict, infer, etc.) a thermal image or images corresponding to a layer or layers. In some examples, the first machine learning model may determine a thermal image or images based on geometrical data. Geometrical data is data indicating a model or models of an object or objects. A model is a geometrical model of an object or objects. A model may specify shape and/or size of a 3D object or objects. In some examples, model may be expressed using polygon meshes and/or coordinate points. For example, a model may be defined using a format or formats such as a 3D manufacturing format (3MF) file format, an object (OBJ) file format, computer aided design (CAD) file, and/or a stereolithography (STL) file format, etc. In some examples, the geometrical data indicating a model or models may be received from another device and/or generated. For instance, the apparatus may receive a file or files of geometrical data and/or may generate a file or files of geometrical data. In some examples, the apparatus may generate geometrical data with model(s) created on the apparatus from an input or inputs (e.g., scanned object input, user-specified input, etc.). Examples of geometrical data include model data, shape image(s), slice(s), contone map(s), etc.

A shape image is an image that indicates object geometry. Examples of a shape image may include a slice or a contone map(s) (e.g., fusing agent contone map and/or detailing agent contone map). For instance, the apparatus (or another device) may slice a 3D model of an object or objects. In some examples, slicing may include generating a set of 2D slices corresponding to the model. A slice is a portion or cross-section. In some approaches, the 3D model (which may be indicated by 3D model data) may be traversed along an axis (e.g., a vertical axis, z-axis, or other axis), where each slice represents a 2D cross section of the 3D model. For example, slicing the model may include identifying a z-coordinate of a slice plane. The z-coordinate of the slice plane can be used to traverse the model to identify a portion or portions of the model intercepted by the slice plane. In some examples, a slice or slices may be expressed as a binary image or binary images.

In some examples, the geometrical data (e.g., shape image(s)) may be utilized as input to the first machine learning model. For instance, a high resolution shape image or images (e.g., slice(s), contone map(s), etc.) may be provided to the first machine learning model. In some examples, determining the first thermal image may be based on the geometrical data. For instance, the first machine learning model may produce the first thermal image of the first layer based on the geometrical data (e.g., slice(s), contone map(s), etc.). An example of the first machine learning model is given in relation to FIG. 6.

The apparatus may determine 104, using a second machine learning model, a second thermal image of a second layer based on a simulated thermal image. The second thermal image may have a second resolution that is greater than the first resolution of the simulated thermal image. For example, the second machine learning model may increase resolution in two spatial dimensions (e.g., x and y). In some examples, a bi-cubical interpolation approach may be utilized instead of or in addition to the second machine learning model to increase the resolution in the x-y dimensions. In some examples, the low-resolution simulated thermal image may be translated into high resolution (e.g., approximately 100 dpi and/or a voxel size of 0.25 mm, providing a 4× to 16× resolution increase). In some examples, the resolution increase in the x-y dimensions may be performed as a chain of operations to achieve higher resolutions.

In some examples, the method 100 may include producing the simulated thermal image based on geometrical data. A simulation of manufacturing is a procedure to model actual manufacturing. For example, simulation may be an approach to provide a prediction of manufacturing. A device (e.g., the apparatus or another device) may simulate the thermal behavior (e.g., transient temperature) of material (e.g., a layer or layers of the material). In some examples, the simulation may be based on a model (of an object or object(s)) and/or a slice or slices. For instance, 3D manufacturing may be simulated for a time range to produce the simulated thermal image. For instance, the simulation may produce temperatures for all or a portion of a build volume. Examples of simulation approaches that may be utilized to generate the simulated thermal image may include finite element analysis (FEA) and/or machine learning approaches. In some examples, the simulation may produce a thermal image or thermal images at a first resolution (e.g., low resolution).

In some examples, the second machine learning model may determine the second thermal image of the second layer based on the simulated thermal image and geometrical data (e.g., shape image(s), slice(s), contone map(s), etc.). For instance, the second machine learning model (e.g., neural network(s)) may be utilized with the simulated thermal image at a low resolution and shape images at a high resolution to produce the second thermal image of the second layer. Examples of techniques to determine the second thermal image are described in relation to FIG. 7.

In some examples, the first layer may be a fusing layer and the second layer may be a buried layer. A fusing layer is an exposed layer, a top layer, or a layer undergoing fusing of material. For example, a fusing layer may be a top layer of material that is exposed to a print head and/or thermal projector for sintering. A buried layer is a covered layer. For instance, a buried layer may be a layer beneath or under the fusing layer.

In some examples, the apparatus may receive an input that indicates a parameter or parameters for determining thermal image(s). For example, the apparatus may receive an input via a keyboard, touchscreen, touchpad, audio input, stylus, communication interface, etc. Examples of the parameters may include a height for a surrounding resolution increase, a height range for a resolution increase (e.g., a top layer and a bottom layer within which resolution is to be increased, a range in the z dimension, etc.), a time for surrounding resolution increase, a time range for a resolution increase (e.g., starting and ending time within which resolution is to be increased), height resolution (e.g., an amount of height resolution increase), temporal resolution (e.g., an amount of temporal resolution increase), simulation resolution (e.g., a resolution at which a simulated thermal image may be produced, 1 mm, 2 mm, 4 mm, etc.), and/or horizontal resolution (e.g., x-y resolution for enhanced thermal images). In some examples, the input may indicate the height range or the apparatus may determine a height range based on an indicated height (e.g., 30 layers above and 30 layers below the indicated height). For instance, the apparatus may select the first layer (e.g., top layer of the height range), the second layer (e.g., bottom layer of the height range), and a height resolution based on a received input. In some examples, the apparatus may select a starting time and an ending time based on the time range. The apparatus may increase the height resolution in the height range and/or the temporal resolution in the time range.

In some examples, determining 104 the second thermal image may be performed using the second machine learning model. Examples of techniques and/or structures that may be utilized with a second machine learning model are given as follows. In some examples, the second machine learning model may take a low-resolution simulated thermal image (at 25 dpi, for instance) and a set of neighboring high-resolution shape images (at 150 dpi, for instance). For example, the neighboring high-resolution shape images may be slices and/or contone maps. The second machine learning model may translate each low-resolution simulated thermal image to a corresponding high-resolution simulated thermal image (at 75 dpi, 150 dpi, for instance).

A feature is information that characterizes data. For example, first features may characterize a model (e.g., a 3D object model). In some examples, a device (e.g., an apparatus or another device) may determine the first features from a model.

High-frequency details may be difficult to reconstruct from a low-resolution layer (e.g., thermal image). Shape images (e.g., slices, contone maps, etc.) of the model may be utilized to capture the high-frequency details. For example, a shape image(s) may correspond to the simulated thermal image. For example, shape image(s) may include geometrical information of the model at a layer level and/or may contribute high frequency information in generating a high-resolution thermal image.

In some examples, shape image(s) may correspond to and/or may be mapped to each low-resolution simulated thermal image. In some examples, a simulated thermal image may be aligned to a sequence of shape images (e.g., slices, contone maps, etc.), which may be utilized to compensate for geometrical changes in a printing procedure. In some examples, a sequence of shape images may be utilized to guide spatial prediction for each low-resolution simulated thermal image. In some examples, the method 100 may include mapping shape images (e.g., sequence of shape images, adjacent shape images, neighboring shape images, three shape images, four shape images, etc.) of the model to color channels to produce a channeled model image. A channeled model image is an image that indicates shape images of a model on respective channels. For example, the method 100 may include mapping three shape images (e.g., a previous shape image, a current shape image, and a next shape image) to three color channels (e.g., red, green, and blue for a red-green-blue (RGB) image) to produce the channeled model image. In some examples, different numbers of shape images (e.g., two, three, four, or more) may be mapped to respective color channels (e.g., two, three, four, or more color channels).

In some examples, the method 100 may include determining the first features based on the channeled model image. For example, determining the first features may include down-sampling the channeled model image to produce a down-sampled channeled model image, and producing, using an inception network, the first features based on the down-sampled channeled model image. An inception network is a neural network for performing (e.g., applied in) a computer vision task or tasks. For example, an inception network may be used to extract the first features from the slices. An inception network may capture global and local features of multiple sizes with a concatenation of different sized kernels, and/or may reduce network parameters and increase training speed by the application of 1×1 convolution.

In some examples, the method 100 may include determining second features. For instance, the second features may be determined using a neural network. For example, the method 100 may include determining the second features using a residual neural network. A residual neural network is an artificial neural network. In some examples, an enhanced deep super resolution network (EDSR) may be utilized. For instance, an EDSR framework may apply a version of a residual neural network to increase performance in reconstructing high-resolution thermal images from low-resolution thermal images. In some examples, determining the second features may include adding a residual neural network input (e.g., simulated thermal image) to a residual block output (e.g., the output of a residual block of the residual neural network).

A score map is a set of values. For example, a score map may be a set (e.g., array, matrix, etc.) of weights, where each weight expresses a relevance of a corresponding feature of the first features. For instance, higher weights of the score map may indicate higher relevance of corresponding first features for determining a high-resolution thermal image. In some examples, the score map may be determined by a neural network or a portion of a neural network (e.g., node(s), layer(s), gating neural network, etc.). For instance, a neural network or a portion of a neural network may be trained to determine weights for the first features. In some examples, a neural network or portion of a neural network may be used to determine feature relevance and adaptively fuse the first features from the model and the simulated thermal image (e.g., low-resolution thermal image). For instance, the neural network or portion of a neural network may utilize the first features (based on a slice or slices, for example), the second features (from residual neural network(s), for example), and the simulated thermal image (e.g., the original simulated thermal image), and may infer the score map as a weight map of the first features.

In some examples, the method 100 may include determining 104 the second thermal image at a second resolution based on the score map, the first features, and the second features. The second resolution may be greater than the first resolution. In some examples, generating the second thermal image at the second resolution may include multiplying the first features element-wise with the score map to produce weighted first features. In some examples, generating the second thermal image at the second resolution may include adding the weighted first features to the second features to produce fused features. Fused features are features that are based on a combination of features. For instance, the first features may be multiplied element-wise by the score map and added to the second features to produce the fused features.

In some examples, determining the second thermal image at the second resolution may include generating, using a neural network or a portion of a neural network (e.g., node(s), layer(s), reconstruction neural network, etc.), the thermal image at the second resolution. For instance, determining the second thermal image at the second resolution may include generating, using convolutional layers, the thermal image at the second resolution (based on the fused features, for instance). In some examples, the fused features may be provided to the neural network (for reconstruction and/or up-sampling, for instance) to produce the thermal image at the second resolution (e.g., high-resolution thermal image). In some examples, the neural network or portion of a neural network (e.g., reconstruction neural network) may include residual blocks (e.g., 8 residual blocks or another number of residual blocks). In some examples, the neural network or portion of a neural network (e.g., reconstruction neural network) may include an up-sampling layer or layers (e.g., 2 up-sampling layers). In some examples, the up-sampling layer(s) may use sub-pixel convolution to aggregate feature maps (e.g., fused features) from a low-resolution space to produce the thermal image at the second resolution (e.g., high resolution).

The apparatus may determine 106, using a third machine learning model, a third thermal image based on the first thermal image and the second thermal image. For example, the third machine learning model may be trained to determine the third thermal image from the first thermal image and the second thermal image. In some examples, the third machine learning model may increase resolution in a third spatial dimension (e.g., z, height). For instance, the third thermal image may correspond to a third layer (e.g., height) between the first layer and the second layer. In some examples, the apparatus may increase a resolution in a z dimension by translating a thermal image or images into a set (e.g., stack) of thermal images. The thermal images may account for object shape variation from layer to layer.

In some examples, an operation or operations of the method 100 may be repeated (e.g., recursively repeated) to further increase resolution. For example, the method 100 may include determining, using the third machine learning model, a fourth thermal image based on the first thermal image and the third thermal image. For instance, the fourth thermal image may correspond to a fourth layer in between the first layer and the third layer.

In some examples, the third machine learning model may be utilized to increase resolution in a time dimension. For instance, the second thermal image may correspond to a second time, and the method 100 may include determining, using the second machine learning model, a fourth thermal image corresponding to a first time that is different from (e.g., before or after) the second time. In some examples, the method 100 may include determining, using the third machine learning model, a fifth thermal image based on the second thermal image and the fourth thermal image. For instance, the fifth thermal image may correspond to a time between the first time and the second time. In some examples, the apparatus may increase resolution in the time domain (e.g., add thermal images for intermediate times and/or timestamps).

Figure 2:
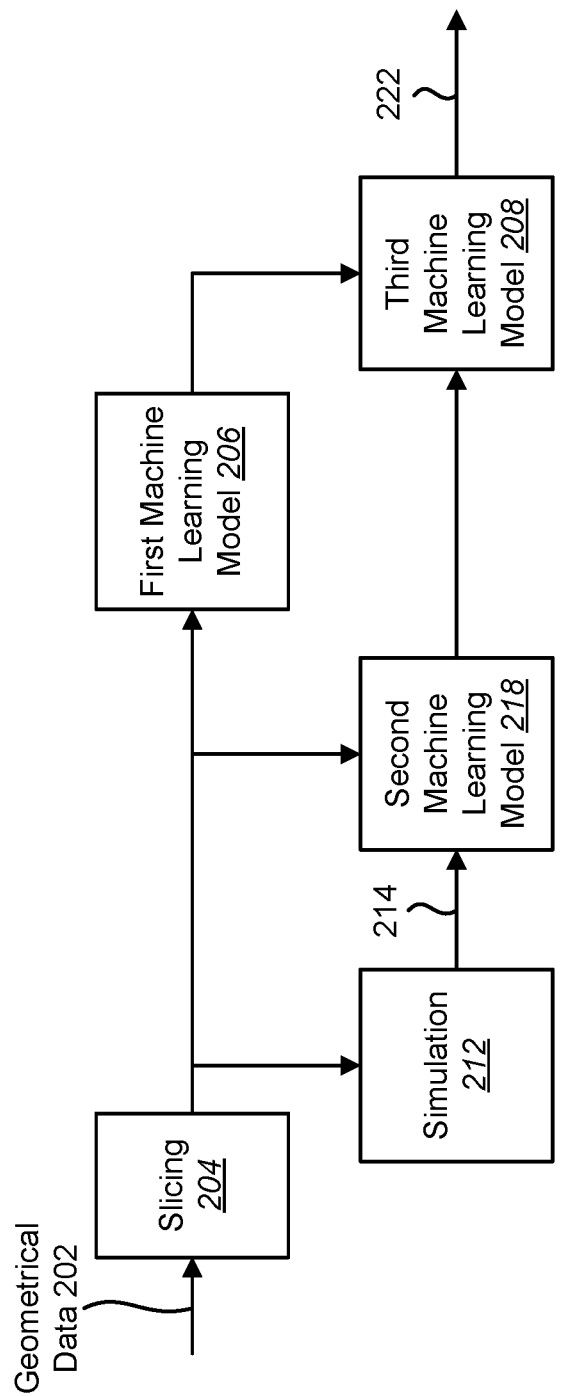
FIG. 2 is a block diagram illustrating examples of functions for thermal image determination.

FIG. 2 is a block diagram illustrating examples of functions for thermal image determination. In some examples, one, some, or all of the functions described in relation to FIG. 2 may be performed by the apparatus 324 described in relation to FIG. 3. For instance, instructions for slicing 204, simulation 212, a first machine learning model 206, a second machine learning model 218, a third machine learning model 208, and/or image integration may be stored in memory and executed by a processor in some examples. In some examples, a function or functions (e.g., slicing 204, simulation 212, the first machine learning model 206, the second machine learning model 218, the third machine learning model 208, and/or image integration, etc.) may be performed by another apparatus. For instance, slicing 204 may be carried out on a separate apparatus and sent to the apparatus.

Geometrical data 202 may be obtained. For example, the geometrical data 202 may be received from another device and/or generated as described in relation to FIG. 1.

Slicing 204 may be performed based on the geometrical data 202. For example, slicing 204 may include generating a slice or slices (e.g., 2D slice(s)) corresponding to the geometrical data 202 as described in relation to FIG. 1. In some examples, the slice(s) may be provided to the simulation 212, to the second machine learning model 218, and/or to the first machine learning model 206.

The simulation 212 may produce simulation data 214. In some examples, the simulation 212 may produce the simulation data 214 based on the geometrical data 202 and/or the slice(s) provided by slicing 204. The simulation data 214 may include and/or indicate a simulated thermal image or images (e.g., low-resolution thermal image(s) with 1 channel). In some examples, in an x-y plane, the simulation 212 may produce a simulated thermal image with a resolution between 25 dots-per-inch (dpi) and 6 dpi (e.g., with simulation voxel sizes of 1 mm, 2 mm, 4 mm, etc.).

In some examples, in the z dimension, the simulation 212 may group multiple print layers into an artificial layer. An artificial layer is an artificial combination of layers. For example, data representing multiple layers may be grouped into an artificial layer for simulation. For example, an artificial layer may correspond to multiple print layers. In some examples, a print layer (e.g., a layer of with a print size) may have a thickness of 0.08 mm (in the z direction, for instance). For instance, the simulation 212 may utilize a 2 mm simulation voxel that groups 25 print layers or may utilize a 4 mm simulation voxel that groups 50 print layers. While examples that utilize 25 or 50 layers are described herein, other examples may utilize other numbers of layers.

In some examples, simulation 212 complexity may arise in the time domain. A time T is a production time for a layer or an amount of time for printing a layer. Examples of T for MJF printing include approximately 7 seconds and approximately 10 seconds. In some examples of the simulation 212, simulated printing of each artificial layer may utilize an amount of time equal to a total of the printing times for the layers included in the artificial layer. For example, a 2 mm thick artificial layer may utilize 25*T for simulated layer printing (or a 4 mm thick artificial layer may utilize 50*T for simulated layer printing, for instance). In some examples, the simulation 212 may provide simulation data 214 for a layer or layers at a time or times (e.g., t=0 and t=25*t). For instance, the simulation data 214 may include layers at a starting time and at an ending time corresponding to the artificial layer. In some examples, the simulation data 214 may include low-resolution thermal images at heights and times for layers that are simulated or actually printed at a simulation time, which may include a fusing layer or layers and/or a buried layer or layers. In some examples, for fusing layers, the apparatus may utilize T (e.g., not 25*T) to define time resolution. The simulation data 214 (e.g., simulated thermal image) may be provided to the second machine learning model 218.

The second machine learning model 218 may determine a thermal image or thermal images with increased resolution in the x-y dimensions, which may be referred to as x-y enhanced thermal images. For example, the second machine learning model 218 may utilize the simulation data 214 and a slice or slices to produce an x-y enhanced thermal image or images (with increased resolution in the x-y dimensions relative to the simulation data 214). In some examples, the second machine learning model 218 may utilize the simulation data 214 (e.g., low-resolution thermal images corresponding to layers), and translate each of the low-resolution thermal images into high-resolution thermal images in the x-y dimensions using geometrical data 202 and/or slices. Examples of techniques to determine the x-y enhanced thermal image(s) are described in relation to FIG. 1 and FIG. 7. For instance, determining the enhanced x-y thermal image(s) using the second machine learning model 218 may be performed in accordance with the techniques described in relation to FIG. 1 and/or FIG. 7 in some examples. In some examples, the x-y enhanced thermal image(s) may be limited in terms of z-dimension resolution and/or temporal resolution in accordance with the simulation data 214. The x-y enhanced thermal image(s) may be provided to the third machine learning model 208.

The first machine learning model 206 may determine (e.g., predict, infer, etc.) a thermal image or thermal images based on the geometrical data 202 (e.g., slice(s)). In some examples, the first machine learning model 206 may be distinct from the second machine learning model 218 by producing the thermal image(s) without simulation data 214. In some examples, the first machine learning model 206 may be a machine learning model that is trained to determine (e.g., predict, infer, etc.) a high-resolution thermal image or images corresponding to a fusing layer or layers. Examples of techniques to determine the thermal image(s) (corresponding to fusing layer(s), for instance) are described in relation to FIG. 6. For instance, determining the thermal image(s) using the first machine learning model 206 may be performed in accordance with the techniques described in relation to FIG. 6 in some examples. The thermal image(s) determined by the first machine learning model 206 may be provided to the third machine learning model 208. In some examples, the thermal image(s) determined by the first machine learning model 206 may be utilized to add information for a fusing layer or layers (since the x-y enhanced thermal images from the second machine learning model 218 may be limited in z-dimension and/or temporal resolution).

In some examples, the thermal image(s) determined by the first machine learning model 206 (e.g., predicted thermal images corresponding to fusing layers) may be provided to a different input of the third machine learning model 208 than the x-y enhanced thermal image(s) determined by the second machine learning model 218. In some examples, the first machine learning model 206 may determine a thermal image corresponding to the same layer and time as an x-y enhanced thermal image determined by the second machine learning model 218. In some examples, the thermal image(s) determined by the first machine learning model 206 may provide additional information relative to the x-y enhanced thermal image(s) of a fusing layer or layers determined by the second machine learning model 218, which may help to improve the accuracy of the enhanced (e.g., interpolated) thermal image(s) 222 produced by the third machine learning model 208. In some examples, the thermal image(s) determined by the first machine learning model 206 may have a same or similar resolution (e.g., ±10%) as the x-y enhanced thermal image(s) determined by the second machine learning model 218 in the x-y dimensions. For instance, a thermal image of a fusing layer determined by the first machine learning model 206 may have a same resolution as an x-y enhanced thermal image of the fusing layer determined by the second machine learning model 218. For example, the thermal image of the fusing layer determined by the first machine learning model 206 may complement a simulated thermal image of the fusing layer.

The third machine learning model 208 may determine an enhanced thermal image or images 222 based on the x-y enhanced thermal image(s) from the second machine learning model 218 and the thermal image(s) (e.g., fusing layer thermal image(s)) from the first machine learning model 206. For example, the third machine learning model 208 may produce enhanced thermal images 222 that are enhanced in the z dimension and/or time dimension. In some examples, the third machine learning model 208 may be an interpolation model to determine additional thermal images. In some examples, the third machine learning model 208 may determine enhanced thermal images 222 corresponding to buried layers at intermediate height values (e.g., between a lower layer associated with an x-y enhanced thermal image from the second machine learning model 218 and an upper layer associated with a fusing layer from the first machine learning model 206 and/or associated with an x-y enhanced thermal image from the second machine learning model 218), which may increase a resolution in the z dimension. In some examples, the third machine learning model 208 may determine enhanced thermal images 222 corresponding to intermediate times (e.g., between an earlier layer associated with an x-y enhanced thermal image from the second machine learning model 218 and a later layer associated with a fusing layer from the first machine learning model 206 and/or associated with an x-y enhanced thermal image from the second machine learning model 218), which may increase a resolution in the time dimension.

In some examples, the third machine learning model 208 may increase resolution in the z dimension and/or the time dimension. For instance, the third machine learning model 208 may be utilized to increase resolution in the z dimension based on thermal images of an upper layer and a lower layer, and/or may be utilized to increase resolution in the time dimension based on thermal images of an earlier layer and a later layer. In some examples, two instances (e.g., similarly structured architectures with the same or different training) of the third machine learning model 208 may be utilized in sequence to respectively increase resolution in the z dimension and the time dimension. For instance, the same interpolation model architecture may be utilized to synthesize new thermal images in between provided thermal images in the time dimension and/or z dimension. For example, the third machine learning model 208 may obtain thermal images corresponding to layer 0 and layer 4 and may determine thermal images corresponding to intermediate layers 1, 2, and 3. The third machine learning model 208 may obtain thermal images corresponding to time 0 and time 4, and may determine thermal images corresponding to intermediate times 1, 2, and 3.

In some examples, the third machine learning model 208 may increase resolution based on a height resolution and/or a temporal resolution. For instance, a height resolution of 4× or 16× may be utilized by the third machine learning model 208 to increase a quantity of thermal images in the z dimension by 4× (e.g., 3 additional thermal images for each pair of thermal images) and/or 16× (e.g., 3 additional thermal images for each pair of thermal images provided by the 4× resolution increase). In some examples, the thermal images with increased resolution in the z dimension may be provided to the third machine learning model 208 to increase the resolution in the time dimension.

In some examples, other approaches may be utilized to interpolate thermal images. For instance, optical flow-based approaches may be utilized and/or neural network-based approaches. In some examples, a deep neural network may be utilized to perform interpolation. For instance, the third machine learning model 208 may be a deep neural network that is trained with a dataset and utilized to infer additional thermal images for increased z dimension resolution and/or time dimension resolution.

In some examples, the third machine learning model 208 (e.g., deep neural network) may include a convolutional encoder-decoder to extract structural features of two input thermal images and a volume sampler to compute a differentiable sampling of structural information and/or motion between the two input thermal images. Due to the convolutional encoder-decoder in some examples, the third machine learning model 208 may be utilized for arbitrary image sizes, which may be flexible in performing inferencing for the arbitrary shape(s) of input thermal images. In some examples, due to a feature dependence on input thermal images for interpolation, the third machine learning model 208 may be utilized in z-dimension and temporal-dimension resolution increases by changing inputs accordingly.

In some examples, the third machine learning model 208 may be utilized repeatedly (e.g., recursively) to increase resolution. For instance, the third machine learning model 208 may be utilized more than one time, depending on a scale of a resolution enhancement target. For example, for 4× enhancement, the third machine learning model 208 may be called once, and for 16× enhancement, the third machine learning model 208 may be called iteratively two times to achieve the target resolution. To increase resolution in the z dimension, for instance, the third machine learning model 208 may but utilized to process the input thermal images to form pairs of thermal images corresponding to layers in the z dimension corresponding to a same time. For example, a pair of thermal images may correspond to one layer at height 0 and one layer at height 16, corresponding to the same time. The third machine learning model 208 may be utilized to interpolate the intermediate buried layers at heights 4, 8, and 12. The third machine learning model 208 may be utilized again to produce further increased z-dimension resolution. For instance, using the thermal images corresponding to layers at height 0 and 4, the third machine learning model 208 may determine thermal images for intermediate buried layers at heights 1, 2 and 3.

In some examples, the third machine learning model 208 may be utilized to increase resolution in the time dimension. For instance, the third machine learning model 208 may be utilized to determine (e.g., predict, infer, etc.) the thermal behavior of a layer along with time. In some examples, the third machine learning model 208 may increase resolution in the time dimension after (or before) increasing the resolution in the z dimension. For instance, the third machine learning model 208 may increase resolution in the z dimension first (from high-resolution thermal images, x-y enhanced thermal images, etc.) to form pairs of thermal images at different times at the same height. For example, a pair of thermal images may correspond to one layer with time t=100 seconds (s) and one layer with t=116 s, both at the same height 2000 mm. The third machine learning model 208 may be utilized to interpolate the thermal images for intermediate layers at times t=104 s, t=108 s, and t=112 s, all at the same height 2000 mm. In some examples, the third machine learning model 208 may be utilized repeatedly (e.g., recursively) to determine further increased time resolution. For instance, using thermal images for t=100 s and t=104 s, the third machine learning model 208 may determine (e.g., predict, infer, etc.) intermediate thermal images for layers at t=101 s, t=102 s, and t=103 s.

In some examples, the third machine learning model 208 may increase resolution in the time dimension independently from (e.g., without, separately from) increasing resolution in the z dimension. For instance, the third machine learning model 208 may increase resolution in the time dimension without first increasing resolution in the z dimension.

The third machine learning model 208 may produce an enhanced thermal image or images 222. For instance, the third machine learning model 208 may produce enhanced thermal images 222 corresponding to intermediate layers in the z dimension and/or corresponding to intermediate times in the time dimension. In some examples, the enhanced thermal images 222 may be sorted and/or integrated to produce a high-resolution simulation output. For instance, the high-resolution simulation output may be more detailed in the x-y dimensions, the z dimension, and the time dimension relative to the simulation data 214. In some examples, the first machine learning model 206, the second machine learning model 218, and/or the third machine learning model 208 may be utilized as post-processing after simulation 212, to produce enhanced thermal images 222 (e.g., high-resolution simulation output) at print speed for a printer.

Figure 3:
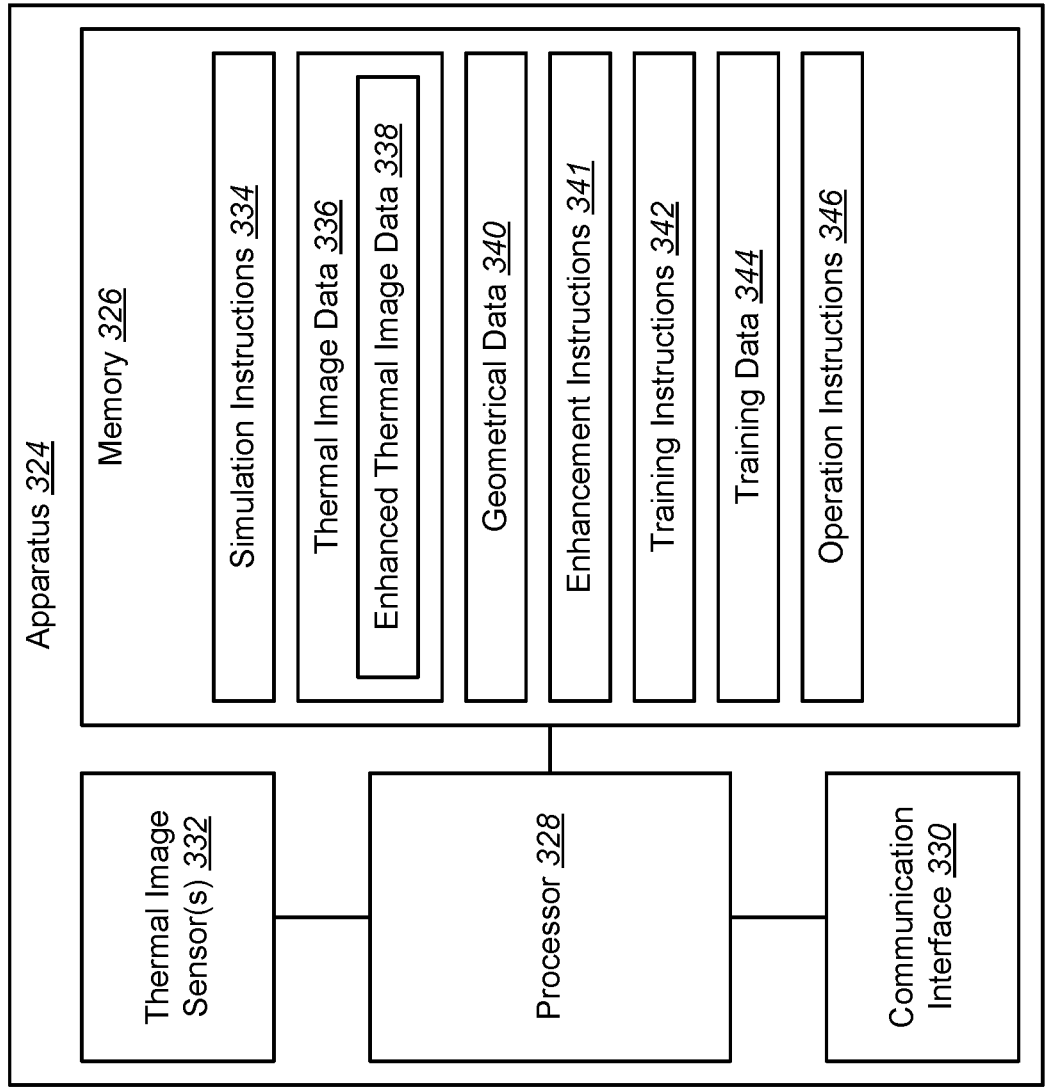
FIG. 3 is a block diagram of an example of an apparatus that may be used in thermal image determination.

FIG. 3 is a block diagram of an example of an apparatus 324 that may be used in thermal image determination. The apparatus 324 may be a computing device, such as a personal computer, a server computer, a printer, a 3D printer, a smartphone, a tablet computer, etc. The apparatus 324 may include and/or may be coupled to a processor 328, a communication interface 330, a memory 326, and/or a thermal image sensor or sensors 332. In some examples, the apparatus 324 may be in communication with (e.g., coupled to, have a communication link with) an additive manufacturing device (e.g., a 3D printer). In some examples, the apparatus 324 may be an example of 3D printer. The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1-7.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term "non-transitory" does not encompass transitory propagating signals. In some examples, the memory 326 may include multiple devices (e.g., a RAM card and a solid-state drive (SSD)).

The apparatus 324 may further include a communication interface 330 through which the processor 328 may communicate with an external device or devices (not shown), for instance, to receive and store the information pertaining to an object or objects. The communication interface 330 may include hardware and/or machine-readable instructions to enable the processor 328 to communicate with the external device or devices. The communication interface 330 may enable a wired or wireless connection to the external device or devices. The communication interface 330 may further include a network interface card and/or may also include hardware and/or machine-readable instructions to enable the processor 328 to communicate with various input and/or output devices, such as a keyboard, a mouse, a display, another apparatus, electronic device, computing device, printer, etc., through which a user may input instructions into the apparatus 324.

In some examples, the memory 326 may store thermal image data 336. The thermal image data 336 may be generated (e.g., simulated, predicted, inferred, and/or enhanced) and/or may be obtained (e.g., received) from a thermal image sensor or sensors 332. For example, the processor 328 may execute instructions (not shown in FIG. 3) to obtain a captured thermal image or images for a layer or layers. In some examples, the apparatus 324 may include a thermal image sensor or sensors 332, may be coupled to a remote thermal image sensor or sensors, and/or may receive thermal image data 336 (e.g., a thermal image or images) from a (integrated and/or remote) thermal image sensor. Some examples of thermal image sensors 332 include thermal cameras (e.g., infrared cameras). Other kinds of thermal sensors may be utilized. In some examples, thermal sensor resolution may be less than voxel resolution (e.g., each temperature readout may cover an area that includes multiple voxels). For example, a low-resolution thermal camera with a low-resolution (e.g., 31×30 pixels, 80×60 pixels, etc.) may be utilized. In other examples, a high-resolution thermal image sensor or sensors 332 may provide voxel-level (or near voxel-level) thermal sensing (e.g., 640×480 pixels).

In some examples, the thermal image data 336 may include a sensed thermal image or images. For example, a sensed thermal image may indicate a build area temperature distribution (e.g., thermal temperature distribution over a fusing layer). In some examples, the thermal image sensor or sensors 332 may undergo a calibration procedure to overcome distortion introduced by the thermal image sensor or sensors 332. Different types of thermal sensing devices may be used in different examples. In some examples, the thermal image data 336 may include a simulated thermal image or images.

In some examples, the memory 326 may store geometrical data 340. The geometrical data 340 may include and/or indicate a model or models (e.g., 3D object model(s)). The apparatus 324 may generate the geometrical data 340 and/or may receive the geometrical data 340 from another device. In some examples, the memory 326 may include slicing instructions (not shown in FIG. 3). For example, the processor 328 may execute the slicing instructions to perform slicing on the 3D model data to produce a stack of 2D vector slices.

The memory 326 may store simulation instructions 334. In some examples, the processor 328 may execute the simulation instructions 334 to produce simulated thermal data. For instance, the processor 328 may produce a simulated thermal image at a first resolution (e.g., low resolution). In some examples, the processor 328 may execute the simulation instructions 334 to produced simulated thermal images corresponding to different times (e.g., times in a simulated or actual printing procedure). For instance, the processor 328 may produce a first simulated thermal image corresponding to a first time and a second simulated thermal image corresponding to a second time. In some examples, producing a simulated thermal image may be performed as described in relation to FIG. 1 and/or FIG. 2. In some examples, the apparatus 324 may receive simulated thermal data from another device.

The memory 326 may store enhancement instructions 341. For example, the enhancement instructions 341 may be instructions for enhancing a simulated thermal image or images. Enhancing the simulated thermal image or images may include increasing the resolution of the simulated thermal image or a set of simulated thermal images. In some examples, the enhancement instructions 341 may include data defining and/or implementing a machine learning model or models. In some examples, the machine learning model(s) may include a neural network or neural networks. For instance, the enhancement instructions 341 may define a node or nodes, a connection or connections between nodes, a network layer or network layers, and/or a neural network or neural networks. In some examples, the processor 328 may utilize (e.g., execute instructions included in) the enhancement instructions 341 to determine enhanced thermal images. An enhanced thermal image or images may be stored as enhanced thermal image data 338 on the memory 326. In some examples, the residual neural network(s), inception network(s), reconstruction neural network(s), up-sampling layer(s), and/or convolution layer(s) described herein may be examples of the machine learning model(s) defined by the enhancement instructions 341.

In some examples, the processor 328 may execute the enhancement instructions 341 to increase a 2D spatial resolution of a simulated image or images. For instance, the processor 328 may increase a 2D spatial resolution of the first simulated thermal image to produce an x-y enhanced thermal image and of the second simulated thermal image to produce a second x-y enhanced thermal image as described in relation to FIG. 1 and/or FIG. 2. For instance, the processor 328 may execute a second machine learning model to produce the x-y enhanced thermal images.

In some examples, the processor 328 may execute the enhancement instructions 341 to determine an additional thermal image or images for a z dimension and/or for a time dimension. For instance, the processor 328 may determine a thermal image or images as described in relation to FIG. 1 and/or FIG. 2. For example, the processor 328 may determine a thermal image corresponding to a third time between the first time and the second time based on the first x-y enhanced thermal image and the second x-y enhanced thermal image. In some examples, the processor may determine the thermal image using a third machine learning model. In some examples, the processor 328 may input the first x-y enhanced thermal image and the second x-y enhanced thermal image to a machine learning model (e.g., the third machine learning model) to determine the thermal image corresponding to the third time.

In some examples, the processor 328 may execute the enhancement instructions 341 to determine a thermal image for the z-dimension. For instance, the processor 328 may determine an additional thermal image or images corresponding to a different height or heights as described in relation to FIG. 1 and/or FIG. 2. In some examples, the additional thermal image(s) may be based on x-y enhanced thermal images (from a second machine learning model, for instance) and/or a fusion layer thermal image(s) (from a first machine learning model, for instance). In some examples, the processor 328 may determine a second thermal image based on the second x-y enhanced thermal image and a third x-y enhanced thermal image, where the second thermal image is at a height between heights of the second x-y enhanced thermal image and the third x-y enhanced thermal image.

In some examples, the memory 326 may store training instructions 342 and/or training data 344. The processor 328 may execute the training instructions 342 to train the machine learning model(s) using the training data 344. Training data 344 is data used to train the machine learning model(s). Examples of training data 344 may include simulated thermal data, geometrical data (e.g., slice(s) and/or contone map(s)), and/or captured thermal image data. For example, the training data 344 may include low-resolution simulated thermal images (e.g., simulated thermal images with a relatively large voxel size). In some examples, the training data 344 may include high-resolution simulated thermal images (e.g., simulated thermal images with a finer voxel size). With a high-resolution voxel size setting, the processor 328 may execute the simulation instructions 334 to output the simulated image of each layer at a higher resolution, finer z-dimension distance, and/or finer time resolution.

In some examples, the processor 328 may execute the training instructions using the low-resolution simulated thermal images and the corresponding high-resolution simulated thermal images (e.g., layers that match with the low-resolution simulated thermal images). Using the low-resolution simulated thermal images and the high-resolution simulated thermal images, the processor 328 may execute the training instructions to train a machine learning model or models (e.g., residual neural network(s), inception network(s), reconstruction neural network(s), up-sampling layer(s), and/or convolution layer(s) described herein, etc.) to predict an enhanced thermal image from a low-resolution simulated thermal image. For instance, the low-resolution thermal images (at lower time resolution, for example) may be utilized as input and the high-resolution thermal images (at higher time resolution, for example) may be utilized as ground truth, which may include artificial fusing layer(s) and/or artificial buried layer(s). In some examples, different types of training data 344 may be utilized to train examples of different machine learning models as provided in Table (1). In some examples, the third machine learning model may be trained with an image interpolation dataset that may not be limited to and/or specific to thermal images (e.g., simulated and/or captured thermal images of a printing procedure). For instance, the third machine learning model may be trained with general image data for image interpolation (e.g., a dataset for training a neural network for video applications, a relatively large-scale dataset for various cases in video interpolation tasks, etc.). In some examples, the third machine learning model may be trained with an image interpolation dataset that includes and/or is specific to thermal images (e.g., simulated and/or captured thermal images of a printing procedure).

TABLE 1

| Model | Use | Training Data | Inferencing | Time (s/layer) |
|---|---|---|---|---|
| First Machine Learning Model | Fusing layer prediction | Captured thermal images, geometrical data | Fusing layer thermal image | 0.05 |
| Second Machine Learning Model | x-y thermal image enhancement | Low-resolution simulated thermal images, high-resolution thermal images, geometrical data | Simulated fusing layers and/or buried layers at high resolution | 0.23 |
| Third Machine Leaning Model (z) | Interpolation in z dimension | Image interpolation dataset, high-resolution simulated thermal images | Additional high-resolution thermal images in z dimension | 0.13 |
| Third Machine Learning Model (t) | Interpolation in time dimension | Image interpolation dataset, high-resolution simulated thermal images | Additional high-resolution thermal images in time dimension | 0.13 |

In some examples, enhanced thermal image(s) may be determined (e.g., predicted and/or inferred) offline and/or independent of any printing of a corresponding object. In some examples, enhanced thermal image(s) corresponding to a layer may be generated (e.g., predicted, calculated, and/or computed) before, at, or after a time that the layer is formed.

In some examples, for machine learning model training, the processor 328 may execute two simulations: one with a low-resolution (e.g., larger voxel size) setting, and another with a high-resolution (e.g., smaller voxel size) setting. In some examples, the simulation outputs (e.g., low-resolution simulated thermal images and high-resolution thermal images) may each be converted from an output file to a folder of x-y layers, which may represent the per layer thermal distribution at each of a set of times (e.g., timesteps). In some examples, the low-resolution and high-resolution x-y layers and the corresponding slice sequences may be mapped (e.g., matched). The low-resolution x-y layer and the corresponding slice sequence may be utilized as input, and the high-resolution x-y layer dataset may be utilized as ground truth for model training.

In some examples, the processor 328 may execute the training instructions 342 to train the machine learning model(s) (e.g., a neural network or neural networks) using a loss function. For example, the training instructions 342 may include a loss function. The processor 328 may compute the loss function based on a high-resolution simulated thermal image and a low-resolution simulated thermal image for training. For example, the high-resolution simulated thermal image for training may provide the ground truth to calculate the loss function. The loss function may be utilized to train the machine learning model(s). For example, a node or nodes and/or a connection weight or weights in the machine learning model(s) (e.g., neural network(s)) may be adjusted based on the loss function in order to increase the prediction accuracy of the machine learning model(s). In some examples, not all of the operations and/or features described in relation to FIG. 3 may be utilized and/or implemented.

When the machine learning model is (or models are) trained, in the inference stage, the apparatus 324 may run the thermal image simulation once (e.g., once for each simulated thermal image), with a low-resolution setting to produce a low-resolution simulated thermal image. The low-resolution simulated thermal image may be utilized as input to the trained model(s) to produce an enhanced (e.g., high-resolution) thermal image or images.

The memory 326 may store operation instructions 346. In some examples, the processor 328 may execute the operation instructions 346 to perform an operation based on the enhanced thermal image(s). In some examples, the processor 328 may execute the operation instructions 346 to utilize the high-resolution results (e.g., results close to print resolution) to serve another device (e.g., printer controller). For instance, the processor 328 may print (e.g., control amount and/or location of agent(s) for) a layer or layers based on the enhanced thermal image(s). In some examples, the processor 328 may drive model setting (e.g., the size of the stride) based on the enhanced thermal image(s). In some examples, the processor 328 may perform offline print model tuning based on the enhanced thermal image(s). In some examples, the processor 328 may send a message (e.g., alert, alarm, progress report, quality rating, etc.) based on the enhanced thermal image(s). In some examples, the processor 328 may halt printing in a case that the enhanced thermal image(s) indicate or indicates an issue (e.g., more than a threshold difference between a layer or layers of printing and the 3D model and/or slices). In some examples, the processor 328 may feed the enhanced thermal image for the upcoming layer to a thermal feedback control system to online compensate contone maps for the upcoming layer.

In some examples, the processor 328 may execute the operation instructions 346 to compare the thermal image (e.g., enhanced thermal image, high-resolution thermal image, etc.) with a sensed thermal image to detect a nozzle failure or nozzle failures (e.g., failure of a nozzle or nozzles). For instance, a print nozzle defect may be detected and/or compensated by comparing a sensed thermal image or images with a high-resolution thermal image or images (based on the simulated thermal image or images, for example). In some examples, a nozzle defect may be detected if a lower temperature streak pattern is detected relative to neighboring pixels in the print direction. For instance, if a temperature difference (e.g., average temperature difference) in a print direction satisfies a detection threshold, a nozzle defect may be detected. Compensation may be applied by increasing a neighboring nozzle injection amount or changing a layout for print liquid (e.g., agent, ink, etc.) application.

In some examples, the processor 328 may execute the operation instructions 346 to compare the thermal image (e.g., enhanced thermal image, high-resolution thermal image, etc.) with a sensed thermal image to detect powder displacement. Examples of powder displacement may include powder collapse and/or part drag. In some examples, the processor 328 may execute the operation instructions 346 to compare the thermal image with a sensed thermal image to detect part drag and/or powder collapse. For instance, powder collapse and/or part drag may be detected by comparing a sensed thermal image or images with a high-resolution thermal image or images (based on the simulated thermal image or images, for example). In some examples, powder collapse and/or part drag (that occurred during printing, for instance) may be detected if a transient colder region is detected. For instance, if a temperature difference (e.g., average temperature difference) in a region satisfies a detection threshold, powder displacement may be detected.

In some examples, the processor 328 may execute the operation instructions 346 to adjust simulation. For example, the processor 328 may compare the thermal image (e.g., enhanced thermal image, high-resolution thermal image, etc.) with a sensed thermal image (e.g., in-line printer sensing) to tune the simulation.

In some examples, the operation instructions 346 may include 3D printing instructions. For instance, the processor 328 may execute the 3D printing instructions to print a 3D object or objects. In some examples, the 3D printing instructions may include instructions for controlling a device or devices (e.g., rollers, print heads, thermal projectors, and/or fuse lamps, etc.). For example, the 3D printing instructions may use a contone map or contone maps (stored as contone map data, for instance) to control a print head or heads to print an agent or agents in a location or locations specified by the contone map or maps. In some examples, the processor 328 may execute the 3D printing instructions to print a layer or layers. The printing (e.g., thermal projector control) may be based on thermal images (e.g., captured thermal images and/or predicted thermal images). In some examples, the processor 328 may execute the operation instructions to present a visualization or visualizations of the enhanced thermal image(s) on a display and/or send the enhanced thermal image(s) to another device (e.g., computing device, monitor, etc.).

Figure 4:
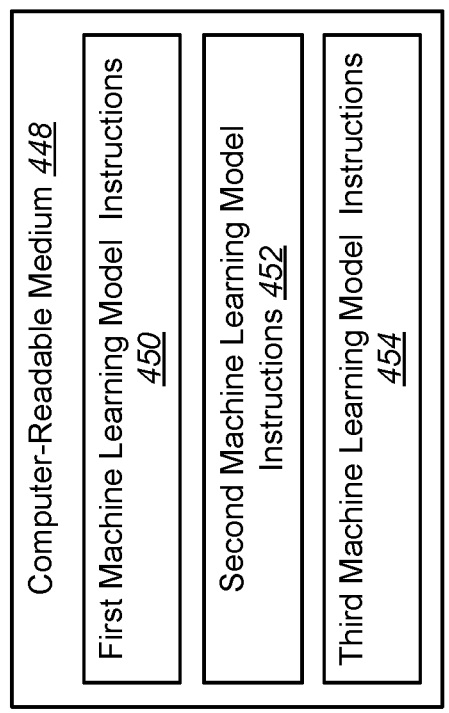
FIG. 4 is a block diagram illustrating an example of a computer-readable medium for image enhancement.

FIG. 4 is a block diagram illustrating an example of a computer-readable medium 448 for image enhancement. The computer-readable medium 448 is a non-transitory, tangible computer-readable medium. The computer-readable medium 448 may be, for example, RAM, EEPROM, a storage device, an optical disc, and the like. In some examples, the computer-readable medium 448 may be volatile and/or non-volatile memory, such as DRAM, EEPROM, MRAM, PCRAM, memristor, flash memory, and the like. In some examples, the memory 326 described in relation to FIG. 3 may be an example of the computer-readable medium 448 described in relation to FIG. 4. In some examples, the computer-readable medium may include code, instructions and/or data to cause a processor perform one, some, or all of the operations, aspects, elements, etc., described in relation to one, some, or all of FIG. 1, FIG. 2, FIG. 3, FIG. 5, FIG. 6, and/or FIG. 7.

The computer-readable medium 448 may include code (e.g., data and/or instructions). For example, the computer-readable medium 448 may include first machine learning model instructions 450, second machine learning model instructions 452, and/or third machine learning model instructions 454.

The first machine learning model instructions 450 may include code to cause a processor to use a first machine learning model to predict a thermal image of a fusing layer based on geometrical data. In some examples, using a first machine learning model to predict the thermal image of the fusing layer may be performed as described in relation to FIG. 1, FIG. 2, FIG. 3, and/or FIG. 6.

The second machine learning model instructions 452 may include code to cause a processor to use a second machine learning model to determine enhanced x-y thermal images based on simulated thermal images. In some examples, using the second machine learning model to determine enhanced x-y thermal images may be performed as described in relation to FIG. 1, FIG. 2, FIG. 3, and/or FIG. 7. For instance, the enhanced x-y thermal images may have an increased x-y resolution relative to the simulated thermal images.

The third machine learning model instructions 454 may include code to cause a processor to use a third machine learning model to determine additional thermal images in a z dimension and a time dimension based on the thermal image and the enhanced x-y thermal images. In some examples, using the third machine learning model to determine additional thermal images may be performed as described in relation to FIG. 1, FIG. 2, FIG. 3, and/or FIG. 5. In some examples, the third machine learning model instructions 454 may include code to cause the processor to execute the third machine learning model a first time to determine a first set of thermal images in the z dimension and code to cause the processor to execute the third machine learning mode a second time to determine a second set of thermal images in the time dimension.

Figure 5:
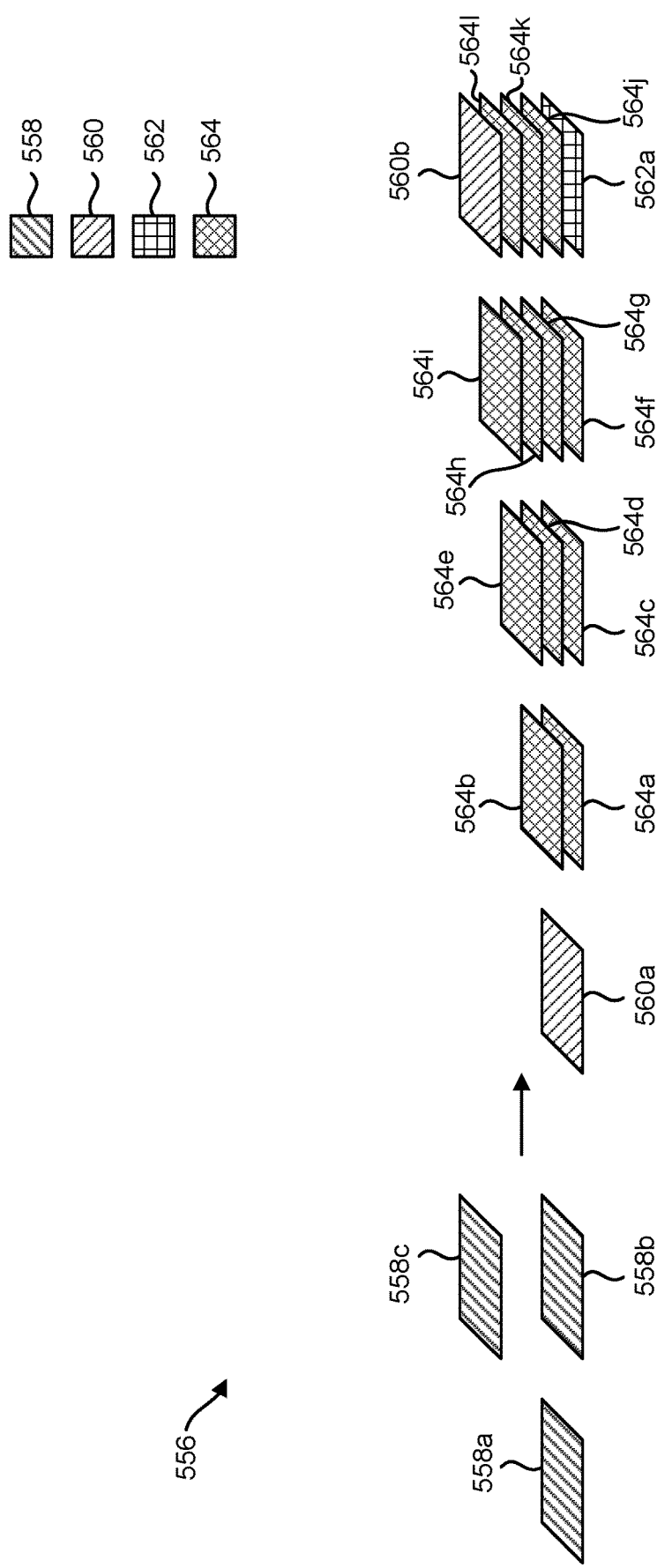
FIG. 5 is a diagram illustrating an example thermal image enhancement.

FIG. 5 is a diagram illustrating an example thermal image enhancement 556. FIG. 5 illustrates examples of simulated thermal images 558*a-c*, predicted fusing layer thermal images 560*a-b*, an x-y enhanced thermal image 562*a*, and additional thermal images 564*a-l*. Respective hatching patterns 558, 560, 562, 564 are utilized to illustrate the simulated thermal images 558*a-c*, predicted fusing layer thermal images 560*a-b*, x-y enhanced thermal image 562*a*, and additional thermal images 564*a-l*. The simulated thermal images 558*a-c*, predicted fusing layer thermal images 560*a-b*, x-y enhanced thermal image 562*a*, and/or additional thermal images 564*a-l* may be determined and/or utilized in accordance with some examples of the techniques described herein. Each of the thermal images may have a corresponding time (e.g., t, timestamp) and/or layer identification (e.g., l). For instance, simulated thermal image A 558a may be simulated for (t=0, l=0), simulated thermal image B 558b may be simulated for (t=1, l=0), and simulated thermal image C 558c may be simulated for (t=1, l=4). As illustrated in FIG. 5, the simulated thermal images 558a-c may be the result of simulation, where simulated thermal image A 558a and simulated thermal image C 558c correspond to fusing layers. Simulated thermal image B 558b corresponds to a buried layer. Each of the simulated thermal images 558a-c may be enhanced in x-y dimensions (by a second machine learning model, for instance) to produce x-y enhanced thermal images at corresponding heights and times. For instance, simulated thermal image B 558b may be enhanced to produce x-y enhanced thermal image A 562a for (t=1, l=0).

Predicted fusing layer thermal image A 560a for (t=0, l=0) and predicted fusing layer thermal image B 560b for (t=1, l=4) may be determined with a machine learning model (e.g., a first machine learning model). Predicted fusing layer thermal image A 560a and predicted fusing layer thermal image B 560b may be utilized with the x-y enhanced thermal images to produce the additional thermal images 564a-l. For instance, a third machine learning model may determine additional thermal image A 564a for (t=¼, l=0), additional thermal image B 564b for (t=¼, l=1), additional thermal image C 564c for (t=½, l=0), additional thermal image D 564d for (t=½, l=1), additional thermal image E 564e for (t=½, l=2), additional thermal image F 564f for (t=¾, l=0), additional thermal image G 564g for (t=¾, l=1), additional thermal image H 564h for (t=¾, l=2), additional thermal image I 564i for (t=¾, l=3), additional thermal image J 564j for (t=1, l=1), additional thermal image K 564k for (t=1, l=2), and additional thermal image L 564l for (t=1, l=3). For instance, to increase resolution in a z dimension and a time dimension, for each of the two layers, three intermediate thermal images for height and time are determined, which translates the original three simulated thermal images 558a-c to a set of 15 thermal images. In some examples, predicted fusing layer thermal images (e.g., 560a-b) may be included in the set of enhanced thermal images (e.g., sorted and/or integrated thermal images) and/or original simulated thermal images (e.g., 558a-c) may not be included in the set of enhanced thermal images.

In FIG. 5, an example of 4× resolution enhancement is illustrated. A similar approach may be used for buried layers in some examples, which may provide for further resolution enhancement (e.g., 16× resolution enhancement). For example, one simulation snapshot of an artificial layer may be translated to 16*16=256 thermal images. For each of the 16 layers, for instance, some examples of the techniques described herein may generate 16 sequential thermal images corresponding to 16 sequential times (e.g., 0*T, 1*T, . . . ).

Figure 6:
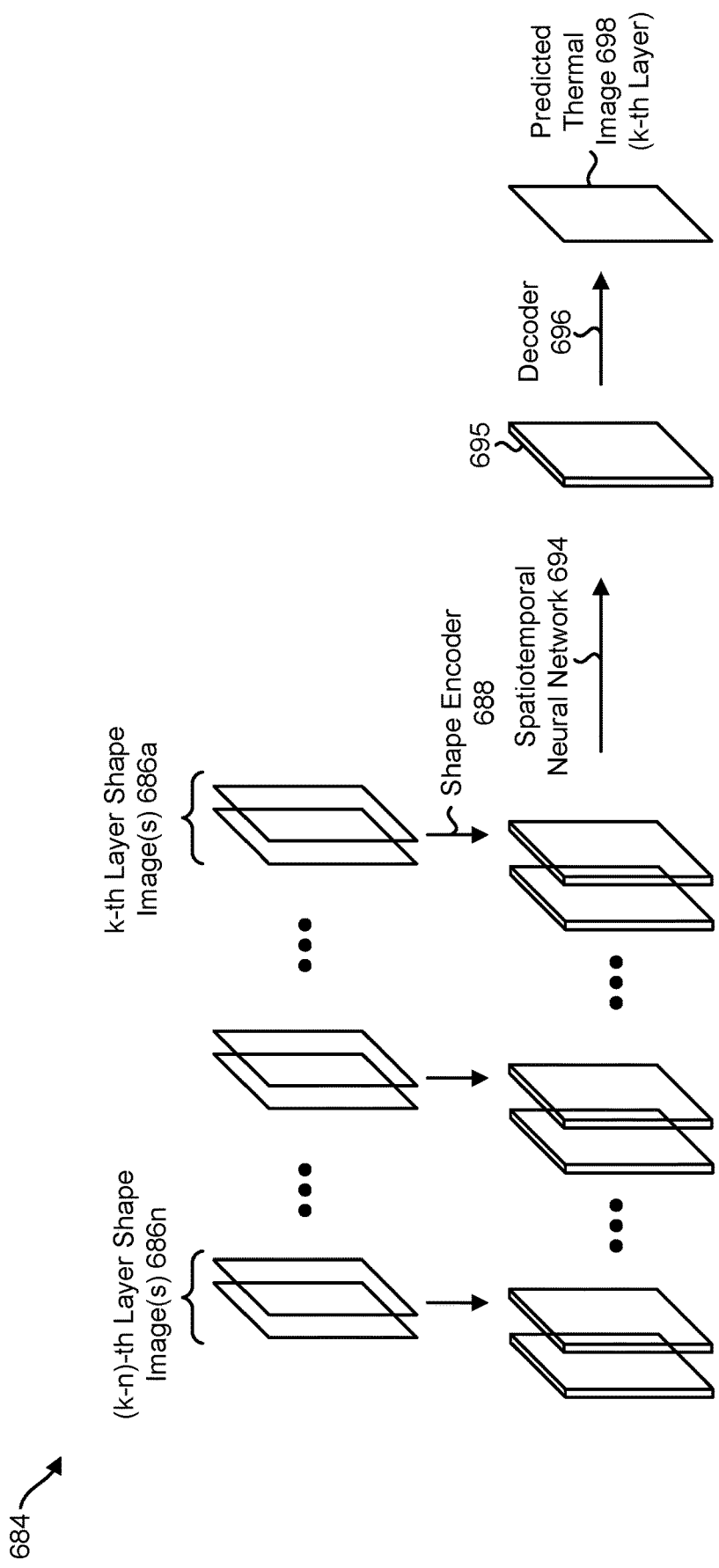
FIG. 6 is a diagram illustrating an example of a neural network architecture.

FIG. 6 is a diagram illustrating an example of a neural network architecture 684. The neural network architecture 684 described in connection with FIG. 6 may be an example of the first machine learning model described in relation to one, some or all of FIGS. 1-5. In this example, a high-resolution predicted thermal image 698 may be predicted from a sequence of high-resolution shape images 686a-n (e.g., slices, contone maps, etc.).

In some examples, a sequence of shape images 686a-n (e.g., fusing agent contone map and/or detailing agent contone map), may be utilized to determine the predicted thermal image 698 (of a fusing layer, for instance). For example, a sequence of fusing agent and detailing agent shape images may drive the layer energy application. This information may help to infer the thermal behavior of the current layer. In some examples, sequence of shape images 686a-n may be high-resolution images and may reflect the material phases, which may provide the voxel-level information to infer the thermal behavior of voxels. Accordingly, some of the techniques described herein may be based on a deep neural network for voxel-level thermal prediction.

The neural network architecture 684 may be utilized to predict a high-resolution (e.g., voxel-level) thermal image of a current layer k. At each layer, the layer shape images (or data based on the shape images) may be utilized as input. Accordingly, a spatiotemporal neural network 694 may learn from the historical sequential information from shape images 686a-n.

In some examples, the following operations may be performed to calculate a predicted thermal image 698 of the k-th layer (e.g., the fusing layer): the k-th layer shape images 686a may be passed through a shape encoder 688 (e.g., contone encoder). The encoded shape images may be provided as input to the spatiotemporal (e.g., Conv-LSTM) neural network 694. The output 695 for the k-th layer (at the current timestamp, for example) may be passed through a decoder 696 to produce the predicted thermal image 698 for the k-th layer.

The network architecture 684 may include a spatiotemporal neural network 694. An example of a spatiotemporal neural network 694 is a recurrent neural network. In some examples, the spatiotemporal neural network 694 may include one or multiple stacked Conv-LSTM networks. A Conv-LSTM is a type of recurrent neural network that overcomes numerical instability issues.

In some examples, the shape encoder 688 is a CNN and the decoder 696 is a CNN. For instance, the shape encoder 688, and/or the decoder 696 may be a variety of CNNs combining different components, e.g., convolutional layers, pooling layers, de-convolutional layers, inception layers, residual layers, etc. The architectures of the shape encoder 688, and/or the decoder 696 may be tuned experimentally. In some examples, inception module based CNNs may be utilized for the shape encoder 688 and/or the decoder 696.

In some examples, the neural network architecture 684 may take a sequence of high-resolution shape images 686a-n (e.g., fusing agent contone maps and/or detailing agent contone maps) for layers L-n, . . . , L-2, L-1, L, L+1, . . . , L+n and may predict the corresponding high-resolution thermal image(s) of a fusing layer sequence L, L+1, . . . , L+n. In some examples, the neural network architecture 684 may produce predicted thermal images of fusing layers to be integrated with simulated thermal images for subsequent operations (e.g., determining additional thermal images).

Figure 7:
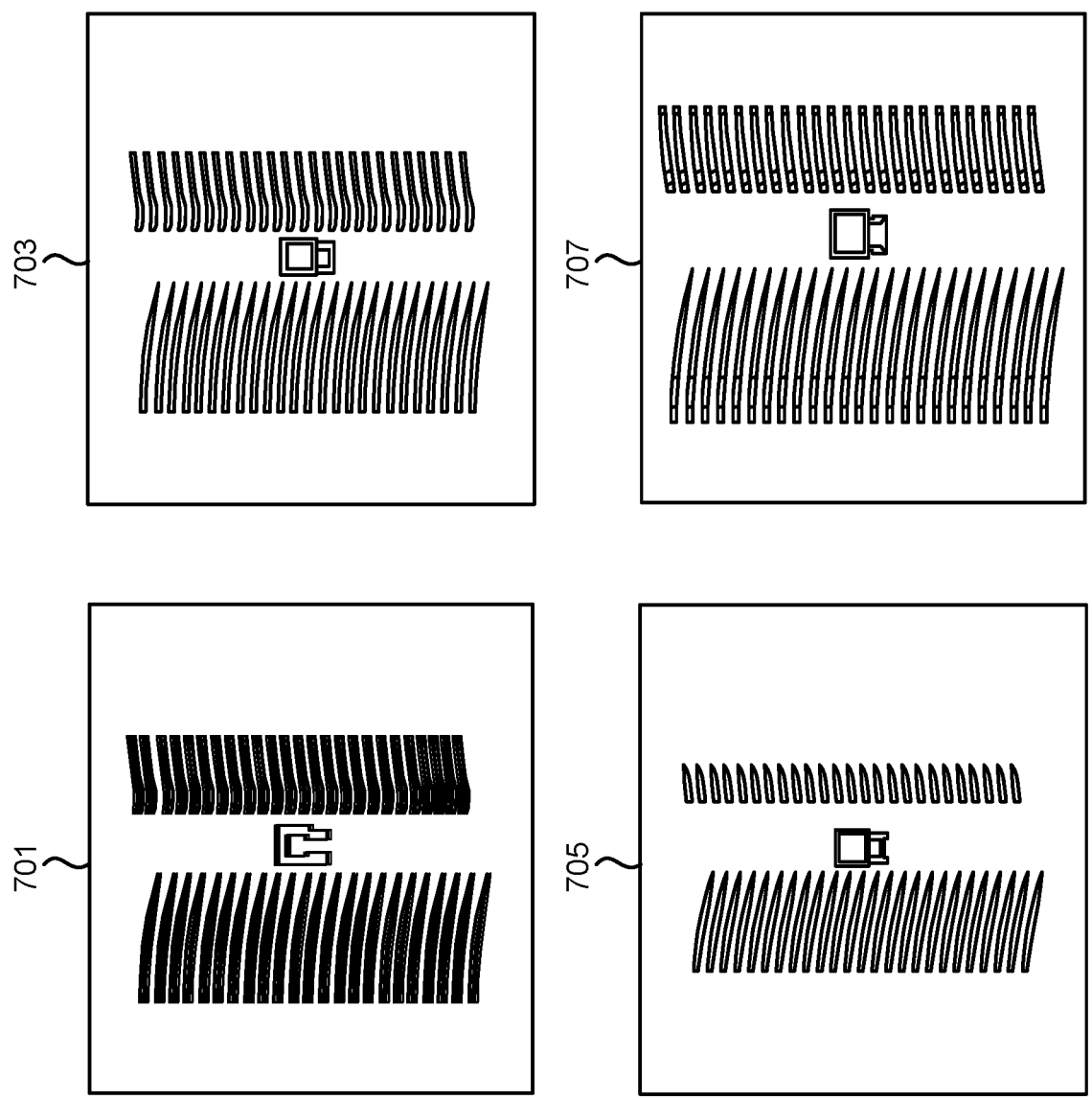
FIG. 7 is a diagram illustrating examples of some data that may be utilized and/or produced in accordance with some of the techniques described herein.

FIG. 7 is a diagram illustrating examples of some data that may be utilized and/or produced in accordance with some of the techniques described herein. For instance, FIG. 7 illustrates a low-resolution simulated thermal image 701 at 15 dpi, a high-resolution thermal image 703 at 75 dpi, a slice 705, and a channeled model image 707. As illustrated in FIG. 7, the low-resolution simulated thermal image 701 appears blurry due to containing less information (relative to the high-resolution simulated thermal image 703, for instance).

Some examples of the techniques described herein may utilize machine learning models that use build geometrical data and simulation data for determining high-resolution thermal images (e.g., high-resolution simulated thermal images). For example, two types of data may be utilized as input data for a machine learning model or models. One type of data may be a low-resolution simulation output. Another type of data may be the geometrical data (e.g., slices and/or contone maps). Some of the techniques described herein may determine high-resolution thermal images in x-y dimensions, the z dimension, and the time dimension using high-resolution geometrical data and/or pipeline data (e.g., predicted thermal images of fusing layers). For instance, some of the techniques described herein may increase resolution in four dimensions: the x dimension, y dimension, z dimension, and time dimension. Once the machine learning models are trained, the computational cost of inferring a high-resolution thermal simulation output may be relatively low, thereby managing to bridge the gap between affordable simulation resolution and actual print resolution. Some examples of the techniques described herein may include three trained deep learning models to bridge the resolution gap and/or accelerate high-resolution results based on simulation. In some examples, the results may be utilized for printer operation management.

In some examples, a machine learning model may utilize two sets of inputs: a low-resolution thermal simulation layer and corresponding geometrical data (which may be represented by slicer output data arranged in a sequential format, for instance), to predict a high-resolution thermal simulation layer. The machine learning model may provide the fidelity of high-resolution thermal simulation outputs and/or may run faster than high-resolution simulation. In some examples, prediction may be performed in near-real time.

Some examples of the techniques described herein may provide four-dimensional (4D) resolution enhancement. For instance, 4D resolution enhancement may be utilized as post-processing of a simulation. Some examples of the techniques described herein may utilize a range (e.g., slab) of simulation output to generate a high-resolution prediction on the fly. For instance, the range (e.g., slab) may be a user-selectable region or a region selected by an apparatus (e.g., 30 layers above and 30 layers below a layer, which may have a thickness of approximately 5 mm or 60*0.08 mm). In some examples, the high-resolution prediction may cover print bed information in the x-y dimensions (e.g., plane), the selected slab thickness (e.g., 30 layers both above and below a selected layer), and a corresponding print time dimension range (e.g., timeframe). In some examples, enhancement in each of the four dimensions (x, y, z, and time) may be achieved differently.

Some of the techniques described herein may enable simulation in contexts beyond offline prediction (e.g., predicting a batch's yield before printing). For instance, simulation may be used in various operations since quantitative results may be provided at print resolution. In some examples, a printer operating system may be utilized to generate a thermal prediction to guide thermal management at a voxel level (e.g., agent fluid generation).

While various examples are described herein, the disclosure is not limited to the examples. Variations of the examples described herein may be implemented within the scope of the disclosure. For example, aspects or elements of the examples described herein may be omitted or combined.

The invention claimed is:

1. A method, comprising:
   determining a first layer, a second layer, and a height resolution from a height range based on a received input;
   determining, using a first machine learning model, a first thermal image of a first layer of additive manufacturing;
   determining, using a second machine learning model, a second thermal image of a second layer based on a simulated thermal image, wherein the second thermal image has a second resolution that is greater than a first resolution of the simulated thermal image;
   determining, using a third machine learning model, a third thermal image based on the first thermal image and the second thermal image; and
   printing, using an additive manufacturing device, one or more of the first layer and the second layer based on the third thermal image.

2. The method of claim 1, wherein the second machine learning model is to increase resolution in two spatial dimensions and the third machine learning model is to increase resolution in a third spatial dimension and is to increase resolution in a time dimension.

3. The method of claim 1, wherein the first layer is a fusing layer and the second layer is a buried layer.

4. The method of claim 1, further comprising producing the simulated thermal image based on geometrical data, and wherein determining the first thermal image is based on the geometrical data.

5. The method of claim 1, wherein the third thermal image corresponds to a third layer between the first layer and the second layer.

6. The method of claim 1, further comprising determining, using the third machine learning model, a fourth thermal image based on the first thermal image and the third thermal image.

7. The method of claim 1, wherein the second thermal image corresponds to a second time, and wherein the method further comprises:
   determining, using the second machine learning model, a fourth thermal image corresponding to a first time that is different from the second time; and
   determining, using the third machine learning model, a fifth thermal image based on the second thermal image and the fourth thermal image.

8. The method of claim 7, wherein the fifth thermal image corresponds to a time between the first time and the second time.

9. An apparatus, comprising:
   a memory; and
   a processor coupled to the memory, wherein the processor is to:
   determine a first layer, a second layer, and a height resolution from a height range based on a received input;
   produce a first simulated thermal image corresponding to a first time and a second simulated thermal image corresponding to a second time;
   increase a two-dimensional (2D) spatial resolution of the first simulated thermal image to produce a first x-y enhanced thermal image and of the second simulated thermal image to produce a second x-y enhanced thermal image;
   determine a thermal image corresponding to a third time between the first time and the second time based on the first x-y enhanced thermal image and the second x-y enhanced thermal image;
   and control an additive manufacturing device to print one or more of the first layer and the second layer based on the thermal image.

10. The apparatus of claim 9, wherein the processor is to input the first x-y enhanced thermal image and the second x-y enhanced thermal image to a machine learning model to determine the thermal image corresponding to the third time.

11. The apparatus of claim 9, wherein the processor is to determine a second thermal image based on the second x-y enhanced thermal image and a third x-y enhanced thermal image, wherein the second thermal image is at a height between heights of the second x-y enhanced thermal image and the third x-y enhanced thermal image.

12. A non-transitory tangible computer-readable medium storing executable code, comprising:
 code to determine a first layer, a second layer, and a height resolution from a height range based on a received input;
 code to cause a processor to use a first machine learning model to predict a thermal image of a fusing layer based on geometrical data;
 code to cause the processor to use a second machine learning model to determine enhanced x-y thermal images based on simulated thermal images;
 code to cause the processor to use a third machine learning model to determine additional thermal images in a z dimension and a time dimension based on the thermal image and the enhanced x-y thermal images; and
 code to cause an additive manufacturing device to print one or more of the first layer and the second layer based on the additional thermal images.

13. The computer-readable medium of claim 12, wherein the enhanced x-y thermal images have an increased x-y resolution relative to the simulated thermal images.

14. The computer-readable medium of claim 12, wherein the code to cause the processor to use the third machine learning model comprises:
 code to cause the processor to execute the third machine learning model a first time to determine a first set of thermal images in the z dimension; and
 code to cause the processor to execute the third machine learning model a second time to determine a second set of thermal images in the time dimension.

* * * * *